F. BERGER.
ELECTRIC DRIVE FOR VEHICLES.
APPLICATION FILED DEC. 21, 1920.
1,397,353.
Patented Nov. 15, 1921.
3 SHEETS—SHEET 3.
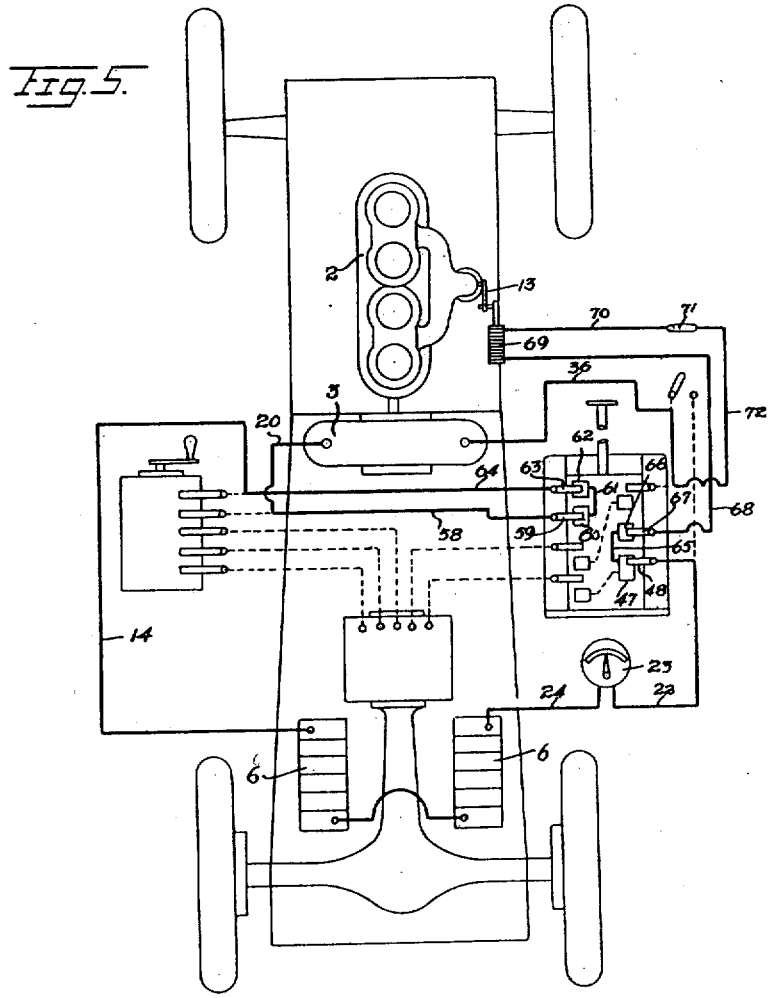
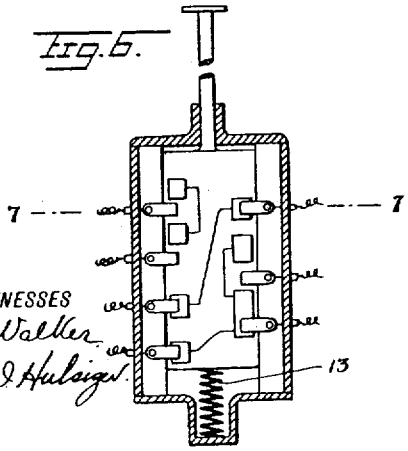
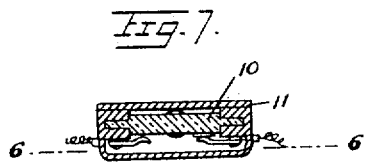
WITNESSES
H. J. Walker
Robert I. Hulsizer
INVENTOR
FRED BERGER
BY
ATTORNEYS

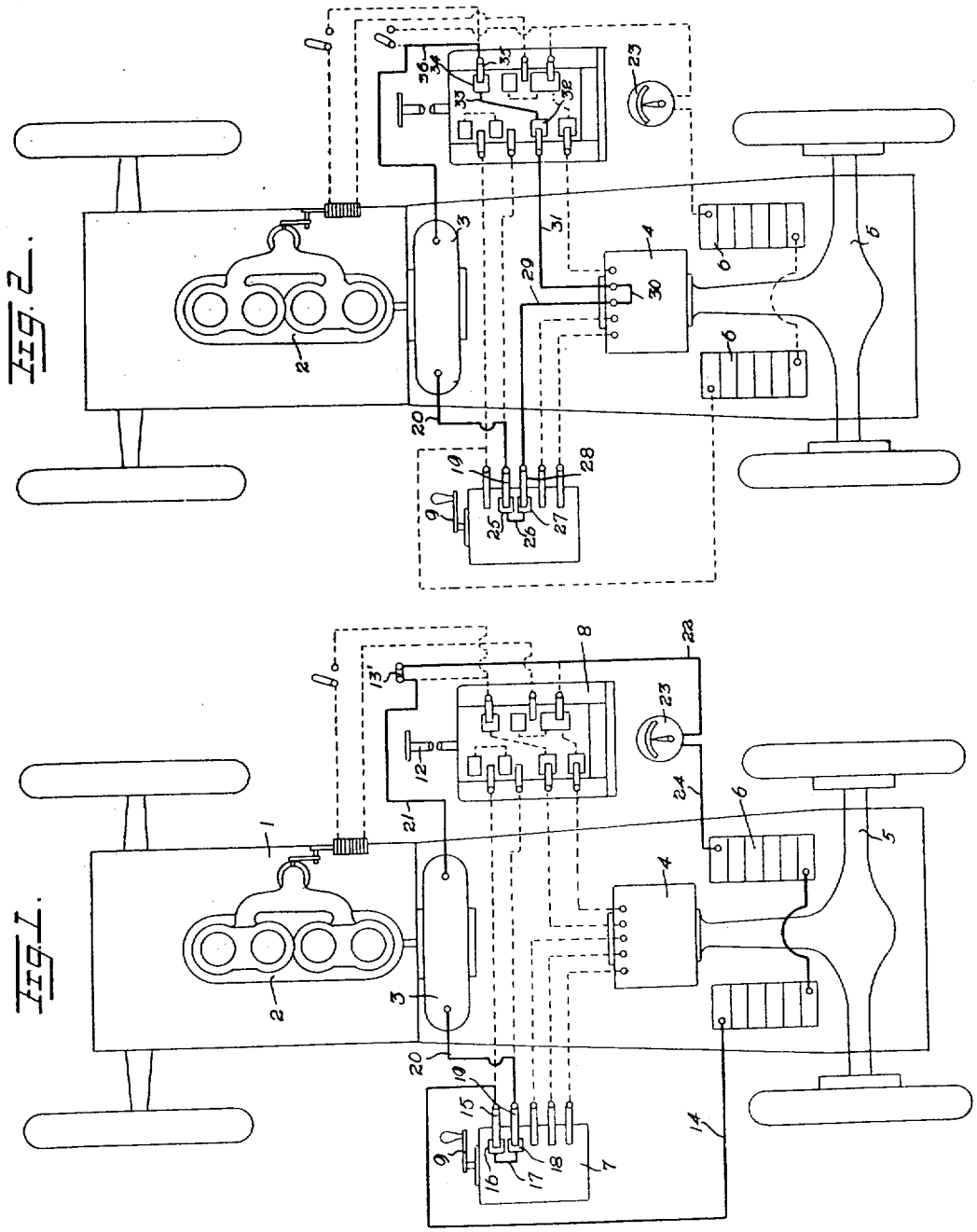

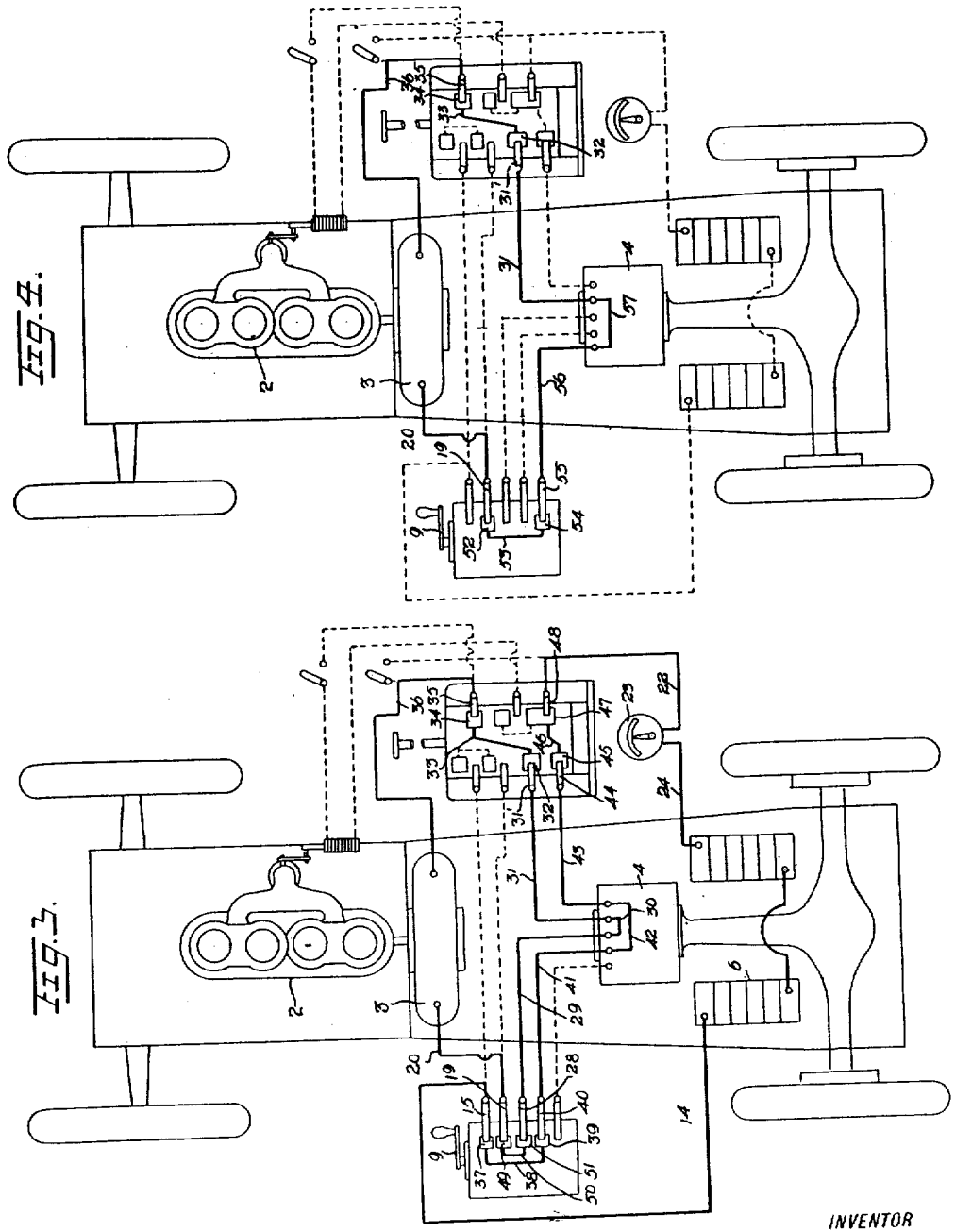

UNITED STATES PATENT OFFICE.

FRED BERGER, OF NEW YORK, N. Y., ASSIGNOR OF ONE-HALF TO EDWARD LOUIS McMANUS, JR., OF NEW YORK, N. Y.

ELECTRIC DRIVE FOR VEHICLES.

1,397,353.   Specification of Letters Patent.   Patented Nov. 15, 1921.

Application filed December 21, 1920. Serial No. 432,296.

*To all whom it may concern:*

Be it known that I, FRED BERGER, a citizen of the United States, and a resident of the city of New York, borough of Manhattan, in the county and State of New York, have invented a new and Improved Electric Drive for Vehicles, of which the following is a full, clear, and exact description.

This invention relates to a new and improved electric drive for vehicles.

An object of the invention is to provide means whereby the power necessary to drive vehicles of any given weight is considerably reduced.

Another object is to provide a simple and easily operable control system whereby excess power generated in the power system is stored for future use.

A further object resides in the provision of means whereby a battery used in conjunction with the power system can be charged at will at any time by the manipulation of a single switch element, regardless of the position or condition of the other members of the power and control systems.

A still further object resides in the particular construction and arragement of parts hereinafter described and claimed and shown in the accompanying drawings.

My invention, in general, comprises a vehicle on which an electric dynamo is mounted and driven by any suitable engine, such as a gasolene engine. This dynamo is electrically, but not mechanically, connected to a reversible motor through the intermediary of controller elements. One of these controller elements is a manually operable circuit changer whereby various circuit connections between the dynamo and the motor can be established. Certain of these circuit changes established by the movement of the manual controller are carried through a second controller element, which is preferably a pedal switch. The circuit arrangements are such that whenever the pedal switch is operated the energy of the dynamo is immediately transferred to a storage battery mounted on the vehicle to charge the same, independent of the condition or position of the manual controller. This operation of the single switch permits the charging of the battery whenever the engine is idle or running free.

Further means are provided whereby the dynamo can be driven as a motor to start the engine, and whereby the engine when running can be speeded up to provide the proper potential for charging the battery.

It will be apparent from a consideration of the following description that other types of power elements can be used than those mentioned and other types of controlling mechanisms can be employed than manual or pedal operated switches, without departing from the spirit of the invention.

The invention is illustrated in the drawings, of which—

Figure 1 diagrammatically represents the circuit conditions existent when it is desired to start the engine;

Fig. 2 is a diagrammatic representation of the circuit conditions existent when the vehicle is being operated in low speed;

Fig. 3 is a similar representation of the circuit conditions for high-speed operation;

Fig. 4 is a similar representation for the reversal of the motion of the vehicle;

Fig. 5 is a similar representation of circuit conditions when the battery is being charged;

Fig. 6 is a detail section of the pedal-operated switch, taken on the line 6—6 of Fig. 7; and Fig. 7 is a section taken on the line 7—7 of Fig. 6.

In the operation of vehicles which are driven by electrical energy, it is highly desirable, on account of the inherent complexity of electrical circuits and the difficulty of repairing the same, to provide an exceedingly compact, simple and easily operable system. Whenever electrical power mechanisms are used in connection with storage batteries, it is highly desirable also to provide simple and easily operable means whereby the battery can be kept constantly charged, and that such charging action can be effected at any time at the will of the driver of the car and by the actuation of a sinmple means regardless of the condition of the circuits or the operation of the car at the time that it is desired to charge the battery.

In the drawings I have shown as the preferred embodiment of my invention a vehicle 1 on which is mounted an internal combustion motor 2 connected to an electric dynamo 3. This dynamo may be of any suitable type desired to give the proper electrical characteristics, such as current and voltage, at normal speeds of the engine. A series wound, reversible electric motor 4 is also mounted on the vehicle to connect to the rear drive shaft 5. A battery, preferably a storage battery, is also mounted on the vehicle body. For the purpose of establishing the proper connections between the dynamo, the motor and the battery under different conditions of operation, a manually operable controller 7 is provided, as well as a pedal operated switch 8. The controller 7 may be of any suitable type, preferably the type in which by movement of a handle 9 a plurality of contact bars are moved relative to a set of fixed contact fingers so as to establish different circuit conditions in accordance with the position of the handle. The pedal switch 8, as shown in Fig. 7, is preferably a reciprocable block of insulating material 10 slidably mounted within a casing 11 and operated by means of the depression of a foot pedal 12. The block 10 is normally held in an upward position by the action of a spring 13 against the bottom. This block is provided with a plurality of contact bars connected in proper circuit relation, which coöperate with a set of fixed contact fingers hereinafter to be described.

In Fig. 1 the connections are shown for the operation of the system for the purpose of starting the internal combustion motor 2. In this figure the handle 9 of the controller is in a neutral position. In order to start the motor it is necessary to close a switch 13′, which may be conveniently mounted on the instrument board or any other part of the vehicle convenient to the operator. When this switch 13′ is closed, the following circuit for the energization of the dynamo 3 as a motor can be traced:—from battery 6, wire 14, contact finger 15, contact bar 16, wire 17, contact bar 18, contact finger 19, wire 20, through the dynamo 3, wire 21, switch 13′, wire 22, ampere hour meter 23, wire 24, back to the battery 6. The flow of current through the dynamo in this direction causes it to be actuated as a motor. Its rigid connection with the internal combustion motor 2 causes this motor to be turned over, whereby the motor 2 can be started. As soon as the motor is started the switch 13′ is opened. When this switch is opened, the battery is disconnected from the dynamo 3, and it will also be observed that there is no electrical connection between the dynamo and the motor 4. The dynamo, therefore, is being turned over by the motor 2 under no load conditions.

Referring to Fig. 2, and assuming that it is desired to start the vehicle in motion in low speed, the handle 9 is moved to the first operating position, whereupon the following circuit can be traced: from dynamo 3, wire 20, contact finger 19, contact bar 25, wire 26, contact bar 27, contact fingers 28, wire 29, winding 30 of the motor 4, wire 31, contact bar 32 of the pedal-operated switch 8, wire 33, contact bar 34, contact finger 35, wire 36, back to the dynamo 3. In this position of the controller handle, and with the pedal-operated switch 8 in a neutral position, it will be apparent that one winding of the motor 4 is energized to move the motor slowly at a low speed. In this position of the controller handle 9 the switch 13′ is open, so that the battery has no connection with the system in low speed.

Considering Fig. 3, when it is desired to operate the vehicle at high speed the controller handle is moved to a second position in which the following circuit can be traced: from battery 6 to wire 14, contact finger 15, contact bar 37, wire 38, contact bar 39, contact finger 40, wire 41, through winding 42 of the motor 4, wire 43, contact finger 44, contact bar 45, wire 46, contact bar 47, contact finger 48, wire 22, ampere hour meter 23 and wire 24, back to the battery. It will, therefore, be observed that the battery is furnishing current to the winding 42 of the motor. At the same time another circuit can be traced as follows: From the dynamo 3 through wire 20 to contact finger 19, contact bar 49, wire 50, contact bar 51, contact finger 28, wire 29, winding 30 of the motor 4, wire 31, contact finger 31′, contact bar 32, wire 33, contact bar 34, contact finger 35, wire 36, back to the dynamo 3. Therefore, it is observed that in the high-speed position of the controller handle 9 the dynamo 3 and the battery 6 are operating over parallel circuits each to energize the reversible motor 4 in parallel. This, therefore, provides circuits whereby the maximum energy of the system is supplied to the motor 4 to drive the vehicle at high speed. It will be observed that in this position of the controller handle 9 the pedal switch 8 is still in its neutral position.

Referring to Fig. 4, the controller handle 9 is moved to another position to effect a reversal of motion of the vehicle 1, and in this position of the handle 9 the following circuit can be traced: from dynamo 3, wire 20, contact finger 19, contact bar 52, wire 53, contact bar 54, contact finger 55, wire 56, winding 57 of the motor 4, wire 31, contact finger 31′, contact bar 32, wire 33, contact bar 34, contact finger 35, and wire 36 back to the dynamo. The winding 57 which is thus energized by the current from the dynamo 3 is so designed and arranged with respect to the motor 4 that when current flows through it in the direction indicated the armature of the motor is reversed in motion, thereby driving the vehicle in a reverse direction.

Referring to Fig. 5, when it is desired to charge the battery 6, the following circuit can be traced:— from the dynamo 3, wire 20, wire 58, contact finger 59, contact bar 60, wire 61, contact bar 62, contact finger 63, wire 64, wire 14 to one side of battery 6, wire 24, ampere-hour meter 23, wire 22, contact finger 48, contact bar 47, wire 65, contact bar 66, contact finger 67, wire 68, solenoid 69, wire 70, switch 71, wire 72, wire 36, back to the dynamo 3. It will be observed, therefore, that over this circuit the dynamo 3 is feeding current to the battery 6 over a circuit in a direction opposite to that in which the current flows when the battery is discharging. It will also be apparent that in order to establish this circuit it has been necessary to depress the pedal 12 of the switch 8. It will also be observed that when this pedal has been depressed all connections through the controller 7 to the motor 4 have been cut off. A consideration of the circuits will also show that this pedal depression will cut off connections to the motor 4 in any position of the controller 7 and establish a connection between the dynamo 3 and the battery 6 suitable for charging the battery.

Consequently, it is a very simple matter for the driver of the vehicle, for instance when he is coasting and does not desire to energize the motor 4, to depress his pedal thereby disconnecting the motor and permitting the vehicle to coast, and, at the same time, charging his battery, assuming that the ampere hour meter indicates that the battery should be charged. During coasting, whenever he desires to apply energy to the motor again, he can do so by permitting the pedal to assume its normal position whereby the previous circuit is established whether that circuit was the high speed, low speed or reverse circuit. The operation of the pedal, therefore, acts in a manner somewhat analogous to the action of a clutch pedal in that by depressing the pedal the power is disconnected from the driving motor and applied to other uses, whereby the energy of the system is not wasted but stored away.

In charging a battery it is desirable that the engine be driven at high speed in order to cause the dynamo to deliver the proper high potential to the battery 6. Therefore, whenever the battery is to be charged the switch 71 above referred to is closed. This switch may be arranged in any suitable position convenient to the hand of the operator. By closing the switch 71 the solenoid 69 is energized, and this solenoid is connected to the lever system operating the carbureter 73 whereby an increased amount of gas is conveyed to the engine to speed it up the desired amount. The battery will form a load on the generator, and the condition of the battery will determine the amount of current flowing through the generator. As the battery becomes more nearly charged, the current flowing in this circuit will decrease whereby the magnetic action of the solenoid 69 will decrease and permit the carbureter to tend to close up and slow down the engine. In this manner the engine is automatically operated at the proper speed in accordance with the amount of current required to bring the battery back to its proper potential.

It will, therefore, be observed that I have produced a simple, compact power system controlled by the operation of a controller element in conjunction, under certain conditions, with the operation of a pedal switch which acts in a manner analogous to a mechanical clutch. At any time during the operation of the engine 2, the pedal can be depressed to disconnect the battery from the motor and permit the car to run free and, at the same time, store up the energy of the dynamo 3 in the battery 6. The fact that this action can take place independently and regardless of the position of the controller handle 9 is exceedingly important and advantageous. It is quite within the spirit of the invention that other means than a manually operable controller and a pedal operated switch can be used and still perform the functions of this apparatus in accordance with the invention.

What I claim is:

1. A propelling system for vehicles, which comprises a generator, a motor connected to the vehicle for driving the same, a battery and circuits adapted to be established therebetween, a controller operable to selectively establish said circuits, and a switch having a neutral position and adapted when actuated to establish a circuit from the generator to the battery and to disconnect the circuit from the generator to the motor independent of the position of the controller when the switch is operated.

2. A propelling system for vehicles, comprising a generator, a motor, a battery, a controller for selectively establishing circuits therebetween, and means adapted to be actuated at the will of the operator to transfer the energy of the generator from the motor to the battery independently of the position of the controller at the time said means is actuated.

3. A propelling system for vehicles, comprising a generator, a motor, a battery and circuits adapted to be established therebetween, a controller adapted to selectively establish said circuits, a switch adapted when operated to transfer the energy of the generator from the motor to the battery independent of the position of the controller, an engine for driving the generator having a carbureter, a solenoid operably associated with the carbureter, a second switch adapted when actuated to establish a circuit through the solenoid, said circuit through the solenoid being energized upon the actuation of the first-mentioned switch, and means whereby the speed of the engine by the actuation of the carbureter is maintained in proportion to the current passing through the circuit of the battery.

4. A propelling system for vehicles, comprising a generator, a battery, a motor, a controller adapted selectively to establish circuits therebetween, a switch adapted when operated to transfer the energy of the generator from the motor to the battery to charge the battery, and means actuated in proportion to the current in the battery circuit to vary the speed of the generator.

5. A propelling system for vehicles, comprising a generator, a motor, a battery, a controller adapted selectively to establish circuits therebetween, said controller having a neutral position, switching means adapted when actuated to transfer the energy of the generator from the motor to the battery independently of the position of the controller, a second switching means adapted when actuated to establish a circuit from the battery to the generator when the controller is in the neutral position whereby the battery supplies the generator as a motor, a device for varying the speed of the generator, and a third switching means adapted when actuated to establish a circuit through said device when the second switching means is actuated whereby said device receives current in proportion to the amount of current flowing in the battery circuit to vary the speed of the generator.

6. A propelling system for vehicles, comprising a generator, a motor, a battery, a controller adapted selectively to establish circuits therebetween, and a single switching element adapted to disconnect the circuits from the generator to the motor independent of the position of the controller, whereby the vehicle is permitted to coast and the energy of the generator is transferred to the batttery to charge the same during the actuation of the switching means.

FRED BERGER.